May 27, 1969

R. L. BAIR 3,447,006

ELECTRODYNAMIC BRAKE OF MAGNETIC FLUID TYPE

Filed Sept. 28, 1967

INVENTOR.
ROBERT L. BAIR
BY
Meyer, Tilberry & Body
ATTORNEYS

INVENTOR.
ROBERT L. BAIR
BY
Meyer, Tilberry & Body
ATTORNEYS

United States Patent Office 3,447,006
Patented May 27, 1969

3,447,006
ELECTRODYNAMIC BRAKE OF MAGNETIC FLUID TYPE
Robert Lee Bair, Ashland, N.J., assignor to E. W. Bliss Co., Canton, Ohio, a corporation of Ohio
Filed Sept. 28, 1967, Ser. No. 671,498
Int. Cl. H02k 49/00; H02p 15/00
U.S. Cl. 310—93          10 Claims

ABSTRACT OF THE DISCLOSURE

A brake of the electrodynamic type which is especially suitable for use in aircraft arresting systems since it provides a brake having a very low moment of inertia upon start of rotation but capable of providing a large controlled braking torque after a short period of rotation. The disclosed brake includes a metallic annular-shaped rotor forming a closed chamber. The rotor is mounted for rotation with a central shaft which extends axially through the rotor and is connected to the member to be braked. The chamber contains mercury and is arranged so that the mercury collects adjacent the rotor axis when the rotor is at rest; however, when the rotor is rotated the mercury flows radially outwardly under the influence of centrifugal force to the outer periphery of the rotor. Program-controlled electromagnets spaced adjacent the outer periphery of the rotor provide a variable magnetic field through which the rotor and mercury pass during rotation to generate eddy currents which provide an electromagnetic braking torque.

---

The invention is directed toward the brake art and, more particularly, to an improved brake of the electrodynamic type.

The invention is particularly applicable for use in an aircraft arresting system and it will be described with particular reference thereto; however, it will be appreciated that the brake herein described has more general application and may be used in any environment where it is desirable to have a brake which has a low moment of inertia at the start of rotation and which is capable of producing large controlled braking torque shortly thereafter.

Most presently used aircraft arresting systems utilize an elongated flexible element, such as a tape of synthetic fiber or a metallic cable, which is extended across the runway or landing strip in a position to be engaged by a landing aircraft. The outer ends of the element are wound on rotatably mounted reels provided with brakes. Accordingly, when a landing aircraft engages the element, the element is unwound from the reels and the reels rotated. By applying a controlled braking force to the reels, the aircraft is slowed at a desired rate and arrested.

As is apparent, the applied braking force must be closely controlled. Excessive braking at the wrong point in the landing cycle can produce excessive deceleration forces and, consequently, damage the aircraft. Alternately, inadequate braking force will not arrest the aircraft within the desired distance.

Electrodynamic brakes, such as eddy current or magnetic particle brakes, have been well-known and in general use for many years. These brakes allow for close control and flexibility and have, therefore, appeared to be suited for use in aircraft arresting systems. Their use in such systems has not been possible however, because in order to produce the required braking force metallic inductors of large mass and resultant high moment of inertia were required. Since, in aircraft arresting systems, the highest acceleration of the rotating brake member occurs at the instant the aircraft first engages the arresting element, if the rotating brake member has a large moment of inertia the resultant dynamic braking force applied to the arresting element can be excessive. Therefore, the use of electrodynamic brakes in an aircraft arresting system has not been practical in view of their high moment of inertia.

The present invention overcomes these problems encountered with prior electrodynamic brakes and provides an improved brake of this type which has a low moment of inertia upon start up of rotation but provides increased braking torque upon continued rotation.

In accordance with the invention, an improved electrodynamic brake is provided. This brake includes an electrically conductive rotor member mounted for rotation about an axis and defining at least one closed chamber including outer and inner spaced portions. The outer portion is radially spaced from the axis and the inner portion is spaced radially inwardly from the outer portion. A mass of flowable material is within the chamber and substantially fills the inner portion when the member is stationary, but is flowable radially under the influence of centrifugal force to the outer portion upon rotation of the member to increase the member's moment of inertia. Additionally, means are provided for producing a magnetic field transverse to the outer portion whereby eddy currents are developed in the rotor member upon rotation thereof to provide an electromagnetic braking action.

Accordingly, a primary object of the invention is the provision of electrodynamic braking having a low moment of inertia upon the start of rotation but which is capable of providing increased braking torque upon continued rotation.

Another object of this invention is the provision of a brake which provides an electrodynamic braking action by the development of an electromagnetic braking torque, and dynamic braking by the increasing inertia of the brake upon rotation.

Still another object of this invention is to provide an electromagnetic brake for an aircraft arresting system which has a low moment of inertia at the beginning of an arresting cycle and which is easily controlled through an electric servo control.

These and other objects and advantages will become apparent from the following description used to illustrate a preferred embodiment of the invention as read in connection with the accompanying drawings wherein.

Figure 1:
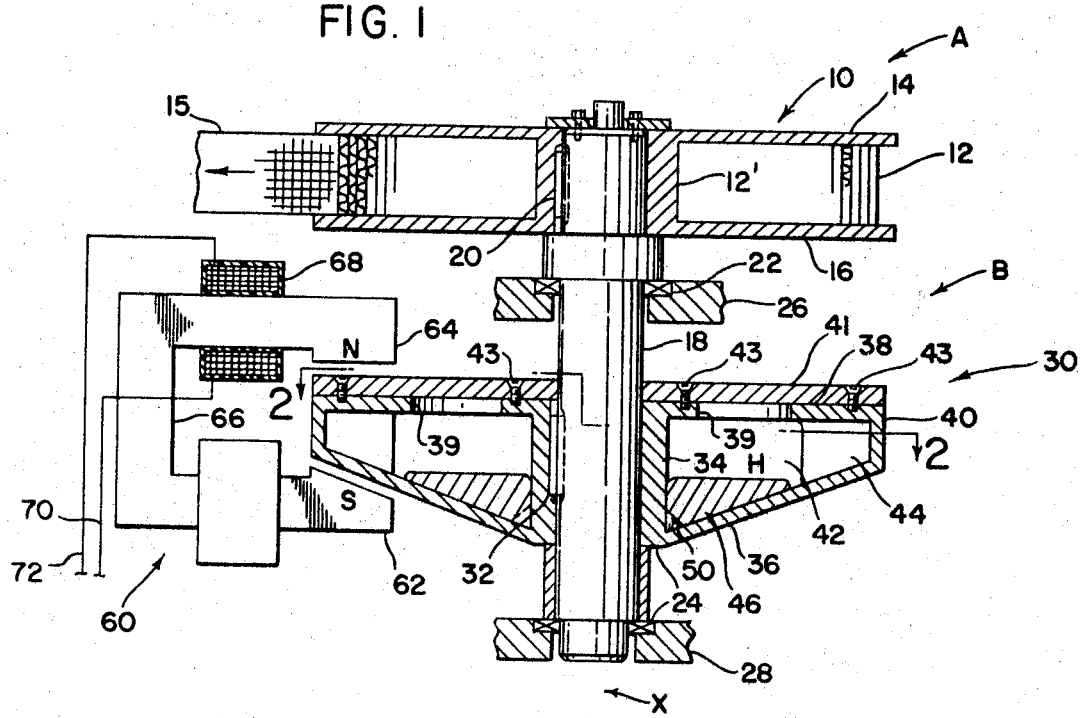
FIGURE 1 is an elevational view showing the electrodynamic brake connected to an arresting tape reel.

Referring now to the drawings wherein the showings are for the purpose of illustrating the preferred embodiment of the invention only and not for the purpose of limiting same, FIGURE 1 shows an aircraft arresting system A which incorporates the improved electrodynamic brake B.

The actual construction and arrangement of the aircraft arresting system A is not critical to the present invention; however, as shown it preferably includes a rotatably mounted reel 10 comprised of a hub portion 12' and a pair of horizontally extending flanges 14 and 16. Reel 10 is connected for rotation with a vertically extending shaft 18 in any convenient manner, such as by a key 20.

Shaft 18 is mounted for free rotation by bearings 22 and 24 carried in foundation members 26 and 28, respectively.

A heavy tape 12, preferably formed from a synthetic fiber such as nylon, is wound on reel 10. Tape 12 includes a feed out portion 15 which forms, or is connected to, a pendant section that extends across the runway (not shown) at a location to engage a landing aircraft. The opposite end of the pendant section would normally be siimlarly connected to a second reel and brake assembly.

As is apparent, when a landing aircraft engages the pendant section, the tape is unwound and reel 10 is rotated. By applying a controlled braking force to the reel the unwinding of the tape and, consequently, the movement of the aircraft, is arrested.

As previously discussed a variety of types of brakes have been used to apply the required controlled braking force to the reel and tape. As explained, these prior brakes have not been entirely satisfactory because of the complex control systems required. The present invention, however, provides an improved electrodynamic type brake B which allows the use of a highly simplified control system.

Although electrodynamic brake B could be of a variety of constructions and configurations, according to the preferred embodiment it includes a rotor member 30 which is connected for rotation with shaft 18 by a key 32. Preferably rotor 30 is of lightweight construction and is formed, for example, from aluminum. The rotor 30 could have a variety of configurations; however, it is shown as an annulus-like member of trapezoidal cross-section formed by a hub 34, an inclined lower wall 36, and upper wall 38 provided with openings 39, and an outer cylindrical wall 40. The openings 39 in upper wall 38 are closed by a plate 41 connected to the wall by a plurality of screws 43. This arrangement forms an internal closed chamber 42 which includes an outer chamber portion 44 and a radially inwardly spaced chamber portion 46.

Figure 3:
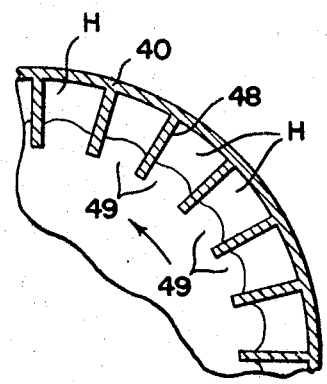
FIGURE 3 is a section taken from FIGURE 2 showing the dynamic position of the rotor during rotation.
Figure 2:
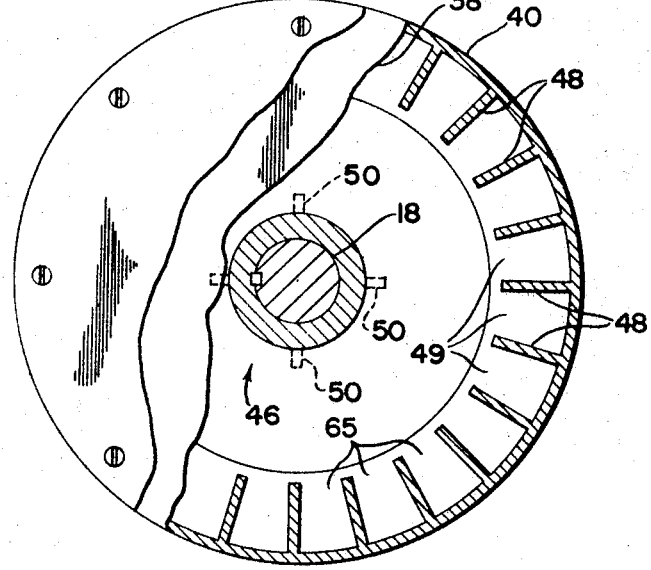
FIGURE 2 is a plan section taken generally along the lines 2—2 of FIGURE 1 and with portions cutaway.

As best shown in FIGURES 2 and 3, a plurality of radially inwardly extending divider plates 48 are positioned at circumferentially spaced positions in the outer chamber portion 44 and form a plurality of inwardly open compartments 49.

The arrangement thus far described provides a rotor having a very low moment of inertia. This is highly desirable, especially when the brake is used in an aircraft arresting system. As previously discussed, at the start of an arrest the aircraft is moving at landing velocity and the reel and rotor are suddenly rotated from zero to their maximum rpm's. If the rotor has a high moment of inertia for the force necessary to suddenly rotate the rotor at this rate can be excessive and, consequently, cause an overly large deceleration rate to be applied to the aircraft and/or breakage of the tape.

In order to gradually apply a deceleration or braking torque to the rotor without substantially increasing the rotor's start-up moment of inertia, the present invention provides two cooperating means. The first comprises means to increase the rotor's moment of inertia after initial rotation has begun, thereby giving a dynamic braking action; while, the second comprises means to generate a magnetic field transverse of the rotor to give an eddy current braking action.

The action of the first means can best be explained by reference to a basic principle of physics. As will be recalled, inertia is defined as the opposition which a body offers to any change of motion whereby an unbalanced force is needed to give it acceleration. Moment of inertia is the equivalent expression for a mass rotating about an axis and experiencing acceleration and is defined as the summation of the products of each individual mass times the square of its distance from its axis of rotation.

The present invention makes use of this principle by having a substantial mass of flowable material, such as mercury H, in the rotor chamber 42. With the rotor at rest, the mercury H will, because of gravity, be in the lower section inner chamber portion 46. The increased moment of inertia of the rotor caused by the mercury at this location is small because the distance from the axis of rotation X to each particle of mercury is small; however, as can be appreciated, upon rotation of the rotor the mercury will be caused to gradually rotate and be thrown outwardly by centrifugal force into compartments 49 thereby increasing the rotor's moment of inertia and producing a dynamic braking effect.

Slip between the mercury and the rotor produces a time lag between rotation of the rotor and corresponding rotation of the mercury. Accordingly, the increase in the rotor's moment of inertia would normally be somewhat gradual. However, this time lag can obviously be reduced or controlled. For example, by the use of means such as a plurality of small exciter vanes 50 positioned adjacent the hub 34 the time lag can be reduced to substantially any extent desired depending upon the size of the vanes. Alternately, the vanes 50 could be arranged to be actuated outwardly at any desired time during the rotation of the rotor.

Figure 5:
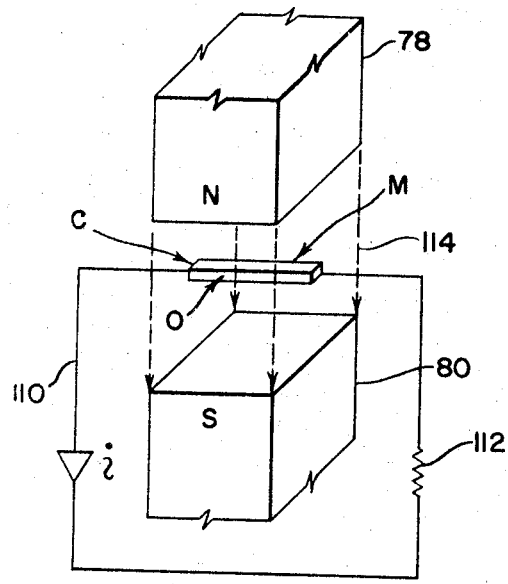
FIGURE 5 is a free-body diagram showing a conductor moving through a magnetic field; and, FIGURE 6 is a free-body diagram showing a conductor distorting a magnetic field.
Figure 6:
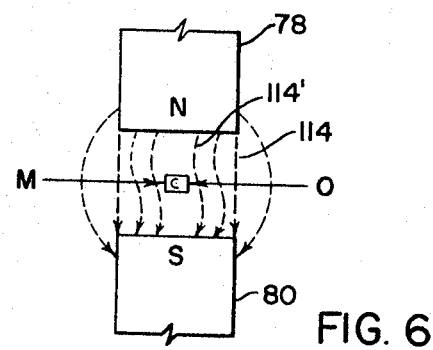

The second means provided to apply a braking torque to rotor 30 can best be explained by reference to FIGURES 5 and 6. FIGURES 5 and 6 show an elemental section of an electrical conductor C moving in a direction indicated by the arrow M and passing transversely through a magnetic field shown by lines of force 114 which extend from a north pole 78 to a south pole 80. The conductor C is shown connected to an external circuit 110 having a resistance 112. The arrow in circuit 110 indicates the direction of flow of current I. The arrow O, in a direction opposite the arrow M, indicates the opposing force operating on the conductor C as it moves through the magnetic lines of force. From basic electrical theory it is known that when an electron is moved through a magnetic field in a direction perpendicular to the field it is acted upon by a force perpendicular to the direction of both its motion and the field. When the electrical conductor C is moved through the field as shown in FIGURE 5, the electrons in the conductor experience a force moving them along the conductor in one direction thereby creating a flow of current I. The current flow thus generated distorts the magnetic field, as shown by lines 114′ in FIGURE 6, and causes the conductor to be acted upon by an electromagnetic force O that opposes the motion of the conductor. A mechanical force equal and in opposite direction to force O is thereby required to push the conductor through the field.

The present invention makes use of this phenomenon to apply a braking force to rotor 30. By generating a magnetic field transverse to the plane of rotation of rotor 30, the rotor acts as a conductor passing through the magnetic field. Since there is no external circuit for the rotor the generated voltage produces eddy currents which circulate in a generally circular pattern and distort the magnetic field in generally the same fashion as discussed in FIGURE 6 to thereby produce an electromagnetic braking torque. The amount of electromagnetic braking torque obtainable is directly proportional to the number of magnetic lines of force which are being cut per unit of time and the number of conductors that pass through the magnetic field per unit of time. The number of magnetic lines of force is, of course, dependent upon the strength of the magnetic field, and the number of conductors in the brake is dependent upon the mass of the conducting material passing through the magnetic field. By changing the strength of the magnetic field and/or the mass of the conducting material passing through the field the magnetic torque can be readily varied.

Referring again to FIGURE 1 it is seen that a magnetic field transverse to the plane of rotation of the rotor 30 is generated by an electromagnet 60. As shown, electromagnet 60 includes a pair of pole pieces 62 and 64, a link piece 66 and field winding 68. Electric leads 70 and 72 provide means for exciting the field winding 68 to produce the required magnetic field. For the sake of clarity, only one electromagnet has been shown in FIGURE 1; however, it should be realized that any number of electromagnets could be provided to generate a larger magnetic field.

As can be seen, in the operation of the subject brake, the combined dynamic and electromagnetic braking effects are interrelated to allow the brake to have an extremely low moment of inertia upon start up of rotation, and yet, be capable of producing substantial braking torques shortly thereafter. To explain, it can be seen that the mass of conductive material passing through the magnetic field is very small at the beginning of rotation because of the construction of the rotor. However, after the rotor has been rotated for a short while the mercury H is thrown outwardly into compartments 65 on the outer periphery of the rotor as shown in FIGURE 3. This causes a greatly increased mass of conductive material passing through the magnetic field thereby permitting a greater amount of eddy currents to be established. By controlling the degree of excitation of the magnet 60 substantially any quantity of braking torque can be applied to the rotor at any point during its rotation.

Although one rotor 30 has been shown, it is readily apparent that any number of rotors could be mounted on shaft 18 to provide a larger maximum breaking torque.

Figure 4:
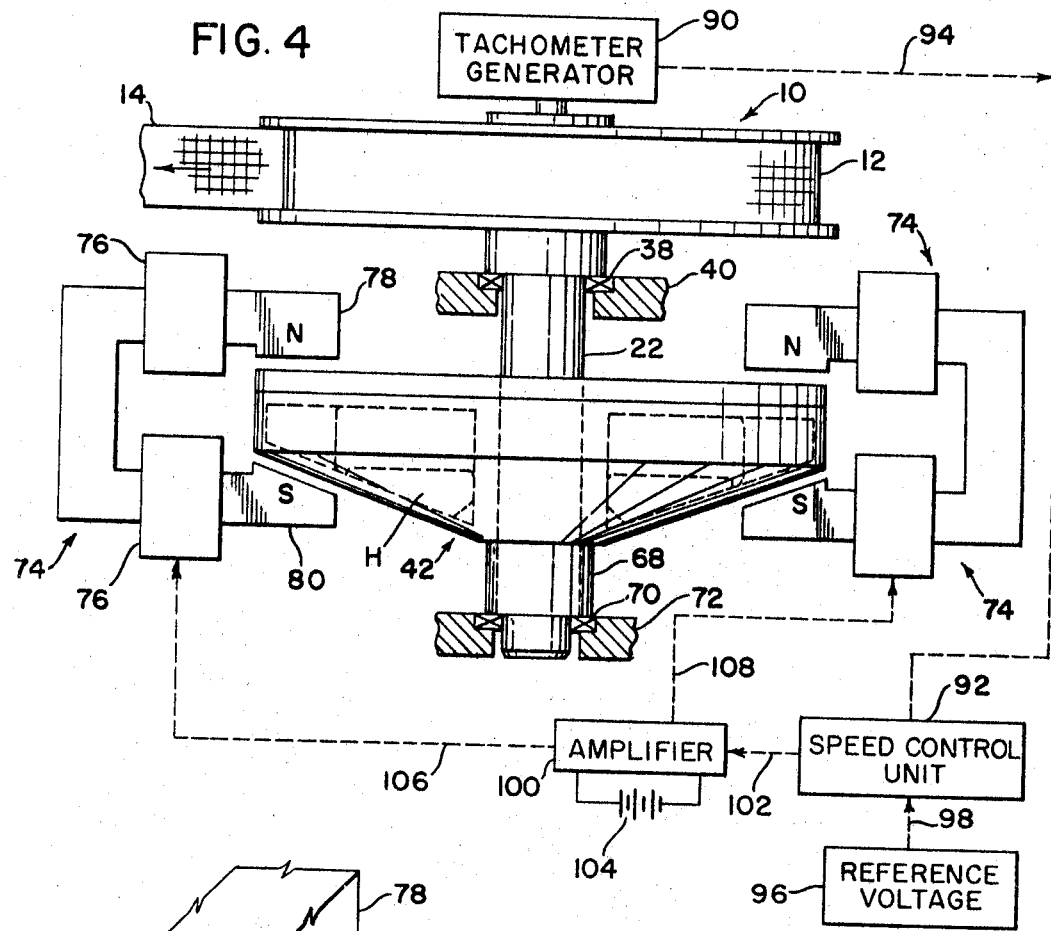
FIGURE 4 is an elevational view similar to FIGURE 1 showing a preferred control arrangement for the brake.

Although it is apparent that any of a large number of different control systems could be utilized to control the energization or excitation of field winding 68, FIGURE 4 shows one typical speed control system which can be used to provide an accurate programmed braking torque for the brake. The similar structural elements of the brake are numbered the same as in FIGURE 1 and will, therefore, not be repeated here.

The speed control system shown on FIGURE 4 consists of a tachometer generator 90 which is connected with shaft 18 and driven thereby. Tachometer generator 90 generates a signal indicative of the actual rotation of rotor 30. This signal is fed to a conventional comparator unit 92 which is also supplied a programmed reference voltage from a reference voltage source 96 through a line 98. The output from comparator unit 92 gives a signal indicative of the differences between the desired rotational speed of the rotor and the actual speed. This output signal is fed through line 102 to an amplifier 100 controlling a source of D.C. current 104. Amplifier 100 amplifies the control signal from the speed control signal 92 to provide an excitation source of D.C. current in lines 70 and 72 to each of the electromagnets 74 to develop a magnetic field which can be varied according to the program fed into the comparator. The reference voltage can be varied in a number of ways, for example as a function of time from the beginning of an arrest cycle or according to the elapsed reel turns from the beginning of the arresting cycle.

The control system of FIGURE 4 is only one of many controls that could be used to control the electrodynamic brake when used in an aircraft arresting system. Another possible control system could, for example, measure the tension in the tape and provide a control signal to the magnetic field so as to produce a constant tension on the tape.

The present invention has been described in great detail sufficient to enable one of ordinary skill in the aircraft arresting art to make and use the same. Obviously, modifications and alterations of the preferred embodiments of the invention will occur to others upon a reading and understanding of the specification and it is my intention to include all such modifications and alterations as part of my invention insofar as they come within the scope of the appended claims.

Having thus described my invention, I claim:

1. An electrodynamic brake comprising: an electrically conductive rotor member mounted for rotation about an axis and defining at least one closed chamber, said chamber including outer and inner spaced portions, with said outer portion being radially spaced from said axis and said inner portion being spaced radially inwardly from said outer portion; a mass of flowable material within said chamber and substantially filling said inner portion when said member is stationary but flowable radially outwardly to said outer portion upon rotation of said member to thereby increase the moment of inertia of said member; and, means for producing a magnetic field transverse to said outer portion whereby eddy currents are developed in said rotor member upon rotation thereof to provide an electromagnetic braking action to said member.

2. The brake as defined in claim 1 wherein the flowable material is electrically conductive whereby the mass subjected to the magnetic field is increased upon rotation thereby increasing the electromagnetic braking action.

3. The brake as defined in claim 2 wherein the flowable material is mercury.

4. The brake as defined in claim 1 wherein the closed chamber is of annular configuration.

5. The brake as defined in claim 4 including vane means in said inner portion of said chamber to impart rotational movement to said flowable material.

6. The brake as defined in claim 4 wherein said outer portion has a plurality of dividing means forming a plurality of compartments therein.

7. The brake as defined in claim 2 including means for varying the strength of said magnetic field.

8. The brake as defined in claim 2 wherein the magnetic field is developed by an electromagnet.

9. The brake as defined in claim 1 including means responsive to the rotation of said member for varying the strength of said magnetic field.

10. In an arresting device for arresting the forward movement of an aircraft during a landing cycle including a reel and an elongated coilable element adapted to be paid out from said reel during landing of said aircraft; the improvement comprising; a brake rotatable with said reel and having a relatively low moment of inertia upon the start of rotation at the commencement of the landing cycle, said brake including means forming at least one closed chamber rotatable about an axis, said chamber including outer and inner spaced portions, said outer portion being radially spaced from said axis and said inner portion being spaced radially inwardly from said outer portion; and, a relatively large mass of flowable material within said chamber which will flow radially outwardly to said outer section upon rotation of said member whereby the moment of inertia of said brake increases with rotation to thereby provide an increased braking torque.

References Cited

UNITED STATES PATENTS

| 2,583,523 | 1/1952 | Winther | 310—93 |
| 2,643,748 | 6/1953 | White | 310—103 |
| 2,743,898 | 5/1956 | King | 310—93 |
| 2,783,643 | 3/1957 | Sihvonen | 310—93 |

WARREN E. RAY, *Primary Examiner.*

R. SKUDY, *Assistant Examiner.*

U.S. Cl. X.R.

244—164, 185; 310—105